(12) United States Patent
Peirson

(10) Patent No.: US 7,241,387 B2
(45) Date of Patent: Jul. 10, 2007

(54) SOLIDS SEPARATOR

(75) Inventor: William L. Peirson, Chatswood (AU)

(73) Assignee: Filtra Limited, Hornsby, New South Wales (AU)

( * ) Notice: Subject to any disclaimer, the term of this patent is extended or adjusted under 35 U.S.C. 154(b) by 393 days.

(21) Appl. No.: 10/821,614

(22) Filed: Apr. 9, 2004

(65) Prior Publication Data

US 2005/0056585 A1 Mar. 17, 2005

Related U.S. Application Data

(63) Continuation of application No. PCT/AU01/01303, filed on Oct. 17, 2001.

(51) Int. Cl.
*B01D 21/26* (2006.01)
*B04B 5/00* (2006.01)
*C02F 1/38* (2006.01)

(52) U.S. Cl. ............................. 210/512.3; 210/512.1; 209/725

(58) Field of Classification Search ................ 210/788, 210/512.1, 512.3; 209/725
See application file for complete search history.

(56) References Cited

U.S. PATENT DOCUMENTS 5,131,544 A 7/1992 Serres et al.
6,251,056 B1 6/2001 Berger et al.

FOREIGN PATENT DOCUMENTS

WO WO-99/52641 A1 10/1999

*Primary Examiner*—David A. Reifsnyder
(74) *Attorney, Agent, or Firm*—Darby & Darby

(57) ABSTRACT

A solids separator including: an elongate tubular housing rotatable around a central axis; a fluid inlet at one end of said housing adapted to receive a flow of a fluid including entrained solids; a first and a second outlet at the opposing end of said housing, wherein, said rotatable housing is effective in imparting a radially outward force to the entrained solids flowing through the separator whereby the solids are concentrated at the peripheral portion of the cross-section of the flow at the first and second outlets and wherein the first outlet is adapted to receive the inner portion of the cross-section of the flow, or filtrate, and the second outlet is adapted to receive the peripheral portion of the cross-section of the flow containing the concentrated solids.

31 Claims, 11 Drawing Sheets

SOLIDS SEPARATOR

The present invention relates to a solids separator and in particular to a solids separator which separates entrained particles contained within a fluid stream.

BACKGROUND OF THE INVENTION

The separation of sewage solids from water remains a fundamental issue in sewage treatment. Fundamentally, two physical processes can be used to remove solids from effluent: filtration and sedimentation.

A sewage stream is typically filtered by passing it through a porous medium. Either due to the surface active properties of the filter medium or the size of the solid material relative to the filter apertures, solid material is captured. Screening is a filtration process that relies solely on the relative size of the apertures and incoming solid material. The primary disadvantage of the filtration process is that the medium becomes fouled with time and must be cleaned. To achieve high removal rates for fine particles, back-flushing with complex process monitoring and control is required to ensure that filtration is effective.

Sedimentation is a process in which gravitational forces are used to separate sewage solids by virtue of their slight difference in density from water. The low relative density of the solids and the fine size of the constituent material have meant that the sedimentation process must take place in either very large quiescent flow-through tanks or by centrifuging in chambers to enhance the gravitational process. In general, centrifuging is not a continuous process or is restricted to very low processing rates.

SUMMARY OF THE INVENTION

The present invention seeks to provide an alternative unit operation for concentrating solids from a fluid stream in a continuous process.

According to one aspect of the present invention there is provided a solids separator including:
an elongate tubular housing rotatable around a central axis;
a fluid inlet at one end of said housing adapted to receive a flow of a fluid including entrained solids;
a first and a second outlet at the opposing end of said housing, wherein,
said rotatable housing is effective in imparting a radially outward force to the entrained solids flowing through the separator whereby the solids are concentrated at the peripheral portion of the cross-section of the flow at the first and second outlets and wherein the first outlet is adapted to receive the inner portion of the cross-section of the flow, or filtrate, and the second outlet is adapted to receive the peripheral portion of the cross-section of the flow containing the concentrated solids.

Preferably the entry point of the first and second outlets is in the form of a tubular separator longitudinally mounted within the rotatable housing so as to define the second outlet therebetween which receives the peripheral portion of the cross-section of the flow containing the concentrated solids. The inner portion of the cross-section of the flow, or filtrate flows through the tubular separator where the first outlet is defined.

Preferably the tubular separator rotates at the same revolutions per minute as the rotatable housing. Alternatively, the tubular separator may rotate faster or slower than the rotatable housing.

According to another aspect of the present invention there is provided a solids separator including:
an elongate tubular housing rotatable around a central axis;
a fluid inlet at one end of said housing adapted to receive a flow of a fluid including entrained solids;
a plurality of outlets at the opposing end of said housing, wherein,
said rotatable housing is effective in imparting a radially outward force to the entrained solids flowing through the separator whereby the more dense solids are situated at the peripheral portion of the cross-section of the flow and the more buoyant solids are situated adjacent the central axis and wherein the plurality of outlets are adapted to receive different portions of the cross-section of the flow.

Preferably the solids separator includes a swirl inducing means coupled to the rotatable housing, wherein said swirl inducing means aids in imparting the radially outward force to the entrained solids.

Preferably the swirl inducing means consists of an impeller and more preferably the swirl inducing means is located before the rotatable housing. More preferably still the swirl inducing means rotates at the same revolutions per minute as the rotatable housing. Alternatively, the swirl inducing means may rotate faster or slower than the rotatable housing.

Preferably the swirl inducing means is located before the rotatable housing whereby a radially outward force is imparted on the entrained particles before entering the rotatable housing.

Preferably, the solids separator includes a self pumping means coupled to the rotatable housing, wherein said self pumping means aids in drawing the fluid through the solids separator.

Preferably the self pumping means consists of an impeller and more preferably the self pumping means is located at the outlet of the rotatable housing. More preferably still the self pumping means rotates at the same revolutions per minute as the rotatable housing. Alternatively, the self pumping means may rotate faster or slower than the rotatable housing.

Preferably, the angular velocity of the fluid at the peripheral portion of the cross-section of the flow is substantially the same as the angular velocity of the rotatable housing.

Preferably, the rotatable housing rotates at between 500 and 5000 revolutions per minute. More preferably the rotatable housing rotates at between 600 and 3000 revolutions per minute and more preferably still the rotatable housing rotates at between 800 and 1500 revolutions per minute.

Preferably the solids separator is orientated in a substantially vertical arrangement and more preferably the fluid inlet is located at the base of said arrangement.

Preferably the flow rate of the fluid through the separator is such that there is minimal turbulence within the separator and more preferably the fluid flows through in a substantially laminar fashion.

The solids separator may include radially extending guide vanes mounted thereto, wherein said guide vanes aid in maintaining the angular velocity of the fluid and/or provide structural support to the solids separator. More preferably the guide vanes are equally spaced circumferentially. More preferably still the plurality of guide vanes may be repeated longitudinally along the fluid flow passage.

The solids separator may also include a central shaft extending through the rotatable housing wherein the shaft does not allow fluid to travel on the central axis through the separator and/or provides structural support to the solids separator. The swirl inducing means and/or self pumping means and/or radially extending guide vanes may be coupled to the central shaft.

Preferably the solids separator includes an outer housing which encloses the rotatable housing.

In another aspect the present invention provides a solids separator including:
- an elongate tubular outer housing rotatable around a central axis;
- an elongate tubular inner housing also rotatable around the central axis and longitudinally mounted within the outer housing thereby defining a passage of flow between the outer and inner housings;
- a fluid inlet at one end of the passage of flow and adapted to receive a flow of a fluid including entrained solids;
- a first and a second outlet at the opposing end of the passage of flow, wherein, the rotatable outer and inner housings are effective in imparting a radially outward force to the entrained solids flowing through the passage of flow whereby the solids are concentrated at the peripheral portion of the cross-section of the flow at the first and second outlets and wherein the first outlet is adapted to receive the inner portion of the cross-section of the flow and the second outlet is adapted to receive the peripheral portion of the cross-section of the flow containing the concentrated solids.

Preferably, the outer housing rotates at the same revolutions pet minute as the inner housing.

Preferably, the first and second outlets are defined by a tubular separator longitudinally mounted between the outer housing and the inner housing whereby the second outlet is defined between the tubular separator and the outer housing and the first outlet is defined between the tubular separator and the inner housing. The tubular separator is preferably rotatable and may rotate at the same revolutions per minute as either the outer housing or the inner housing.

Preferably, the solids separator includes a swirl inducing means, wherein said swirl inducing means aids in imparting the radially outward force to the entrained solids. More preferably, the swirl inducing means is an impeller located on the outer surface of an inverted bell, the outermost circumference of which is coupled to the circumferential edge of the inner housing near the inlet of the passage of flow. Preferably, the also acts as a self pumping means pushing or lifting fluid into the passage of flow.

Preferably, the angular velocity of the fluid at the peripheral portion of the cross-section of the flow is substantially the same as the angular velocity of the outer housing. Preferably the outer and inner rotatable housing rotate at between 500 and 5000 revolutions per minute, preferably at between 600 and 3000 revolutions per minute and more preferably at between 800 and 1500 revolutions per minute.

Preferably the solids separator includes a central shaft extending through the inner rotatable housing wherein the shaft provides structural support to the solids separator. The central shaft may be coupled to a motor or the like and drives the inner and outer housings as well as the swirl inducing means. Preferably the solids separator includes an external housing which encloses the outer rotating housing.

Generally the fluid is a liquid such as liquid waste, and the solids are particles present in a sewage stream, however, the separator may be applied to any fluid stream which includes dense and/or buoyant particles.

Preferably the solids separator may be used in place of a clarifier or a sedimentation pond or in place of, or prior to, any unit operations which are limited by the sedimentation rate of solids. More preferably the solids separator may be used to reduce the solids flux load to a clarifier operating in a biological effluent treatment facility.

In another aspect the above described solids separator may be used to sample the separate phases (liquid/solid) of activated sludge of a biological treatment facility.

BRIEF DESCRIPTION OF THE DRAWINGS

The present invention will become better understood from the following detailed description of a preferred but non-limiting embodiment thereof, described in connection with the accompanying drawings, where in.

DETAILED DESCRIPTION OF THE DRAWINGS

Figure 1:
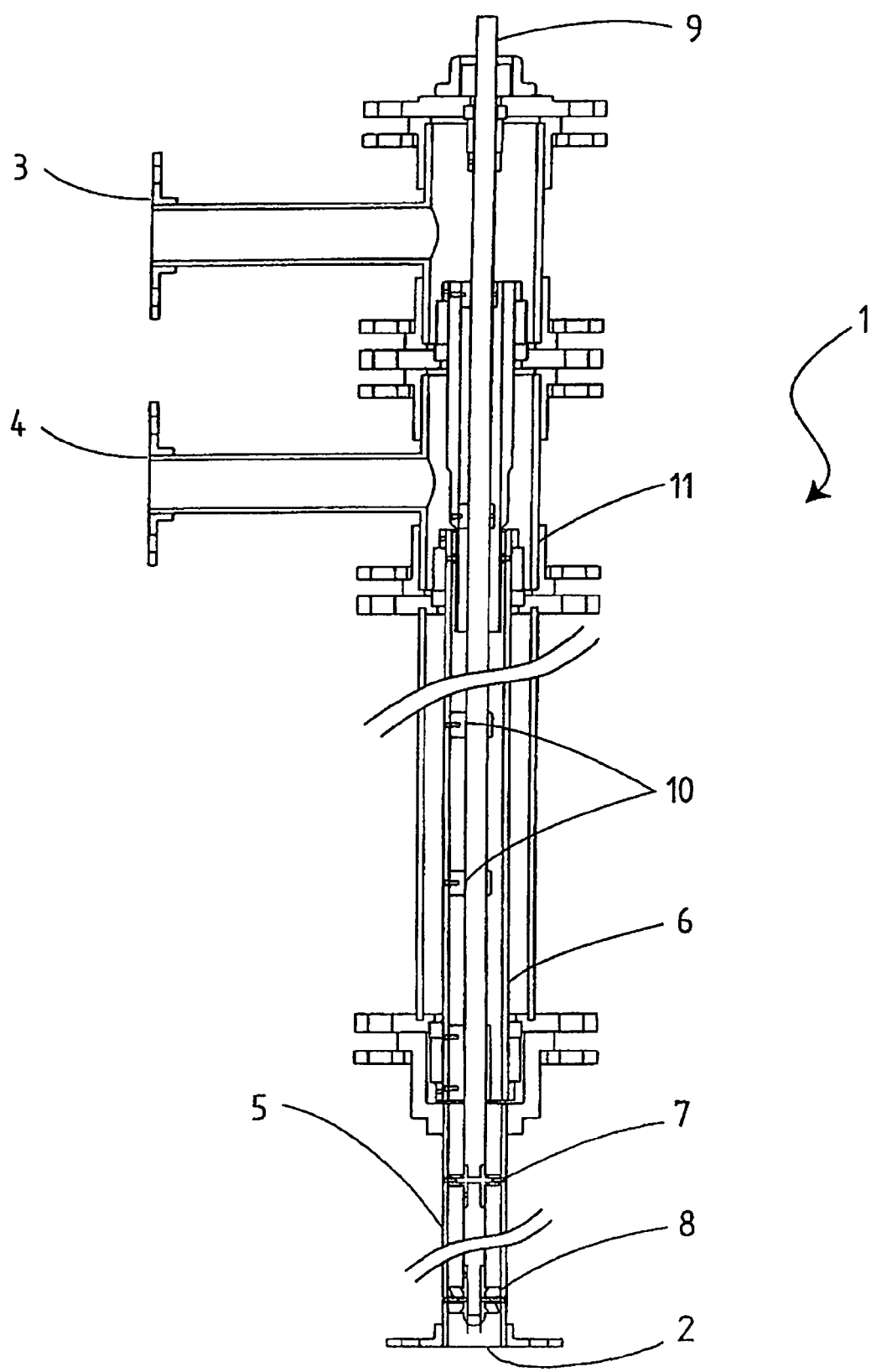
FIG. 1 illustrates a cross-sectional view of a solids separator in accordance with the present invention.
Figure 2:
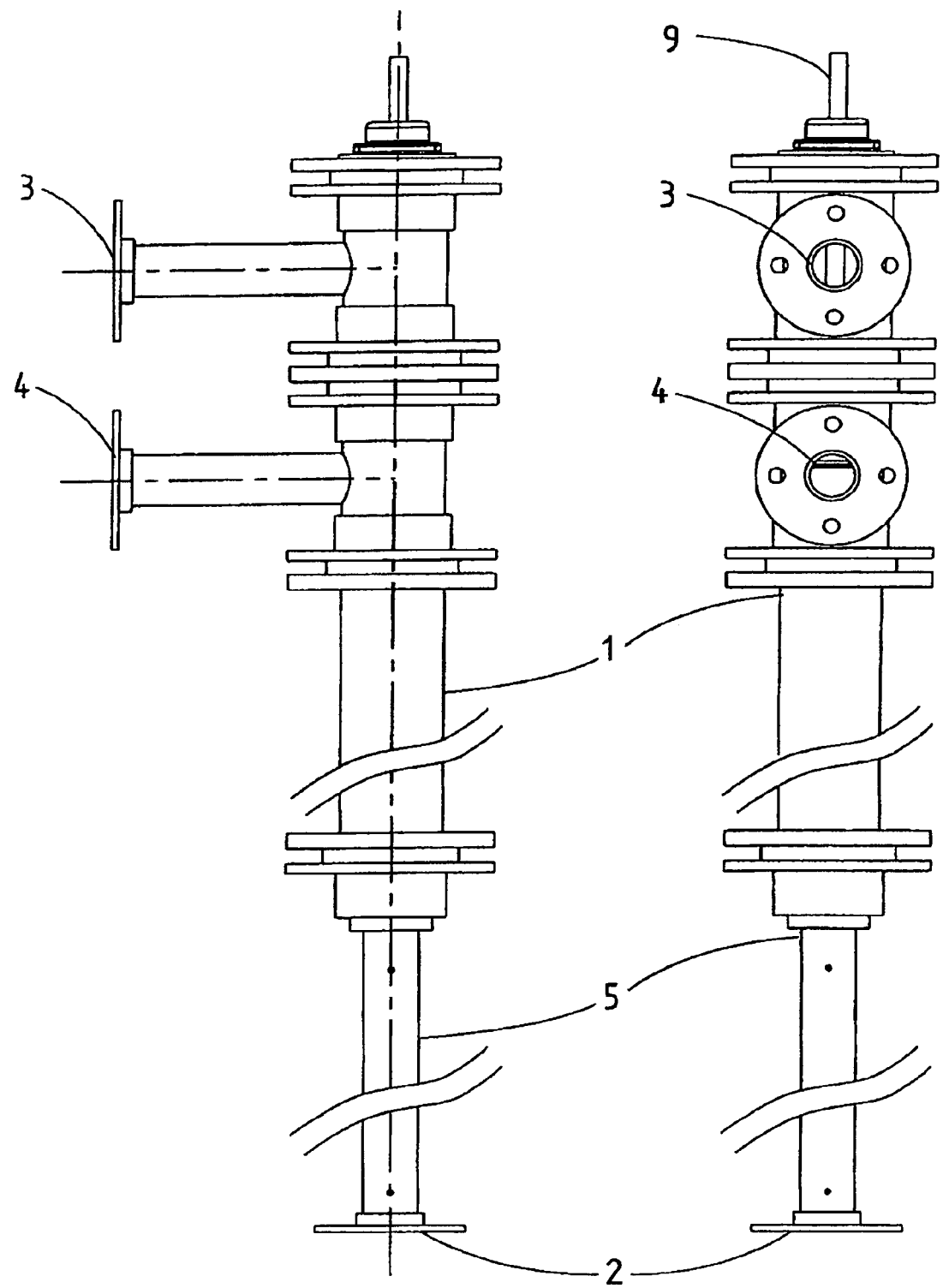
FIG. 2 illustrates a front on and a side on view of the outside of a solids separator in accordance with the present invention.

Referring to FIGS. 1 and 2 there is shown a solids separator 1 which includes a fluid inlet 2 and two fluid exit points 3,4. The separator 1 further includes a swirl inducing portion 5 which imparts a radially outward force to any entrained solids within a fluid flowing through the separator 1 before the fluid enters the rotatable housing 6. The swirl inducing portion 5 includes impellors 7, 8 which are attached to a central shaft 9 running down the central axis of the separator 1. The central shaft 9 is rotated by a motor or other suitable means which also rotates the rotatable housing 6 through connection via support vanes 10 to the central shaft 9.

A fluid entering the separator 1 is initially spun in a circular motion by the swirl inducing portion 5 before it enters the rotatable housing 6 where entrained particles within the fluid stream move towards the inside surface of the rotatable housing 6. Because the housing 5 is spinning at a rate similar to the angular velocity of the fluid there is minimal turbulence as the fluid flows through the separator and the fluid flows in a substantially laminar fashion. The fluid flow is separated into an outer cross-sectional portion and an inner cross-sectional portion by a tubular separator 11 situated within the rotatable housing 6. The inner cross-sectional portion is then directed to the filtrate exit 3 and the outer cross-sectional portion containing the concentrated entrained particles is directed to the solids exit 4.

Figure 3:
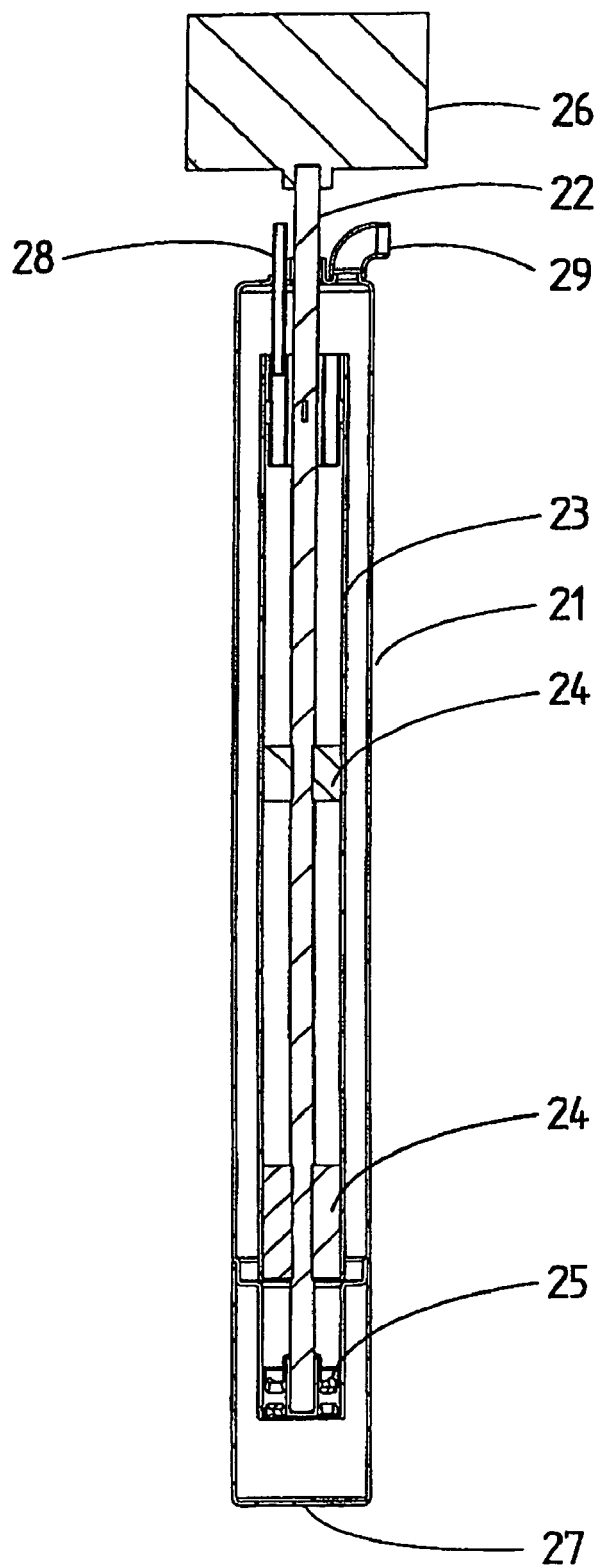
FIG. 3 illustrates a cross-sectional view of a sampling device in accordance with the present invention.
Figure 4:
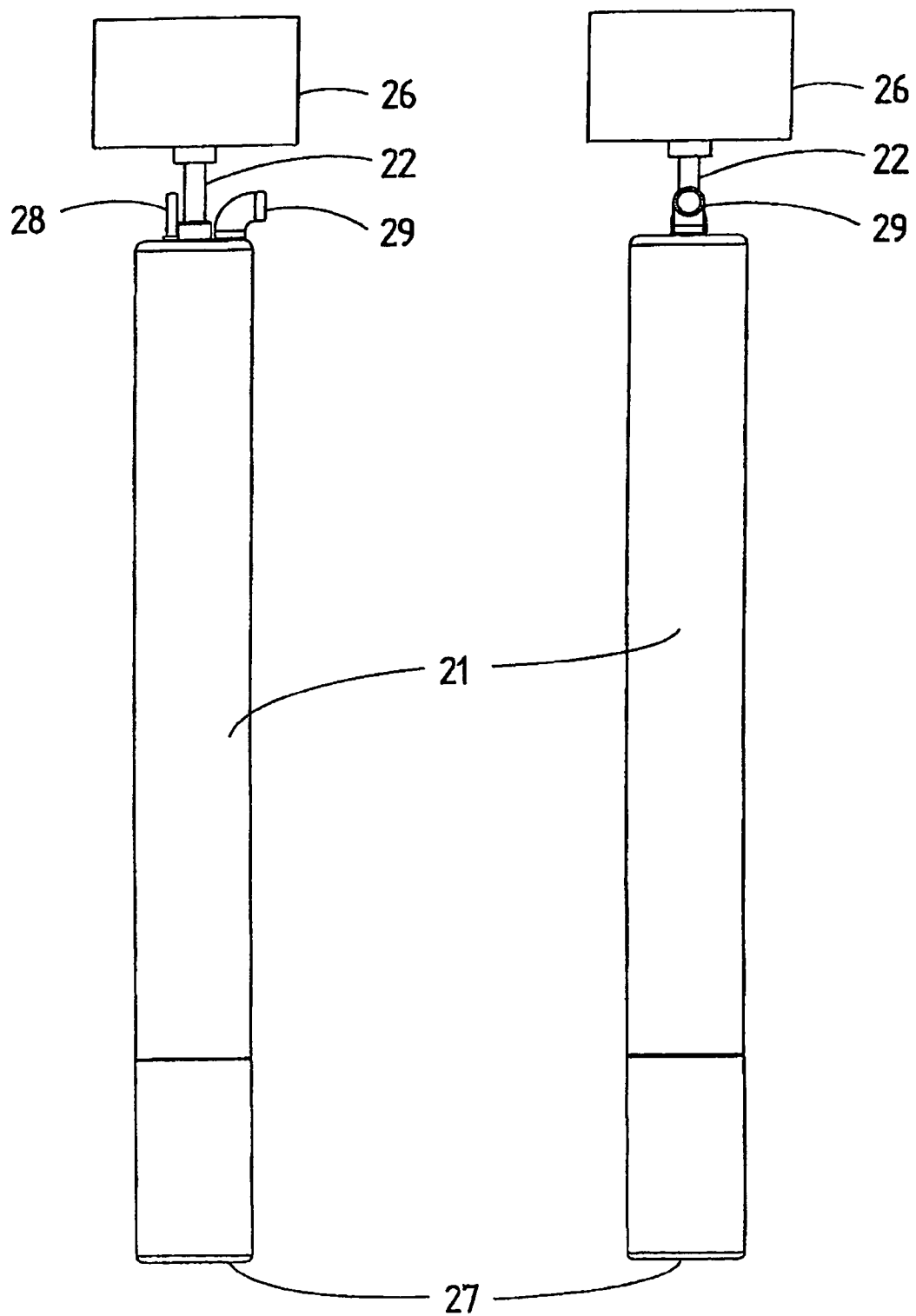
FIG. 4 illustrates a front on and a side on view of a the outside of a sampler in accordance with the present invention.
Figure 5:
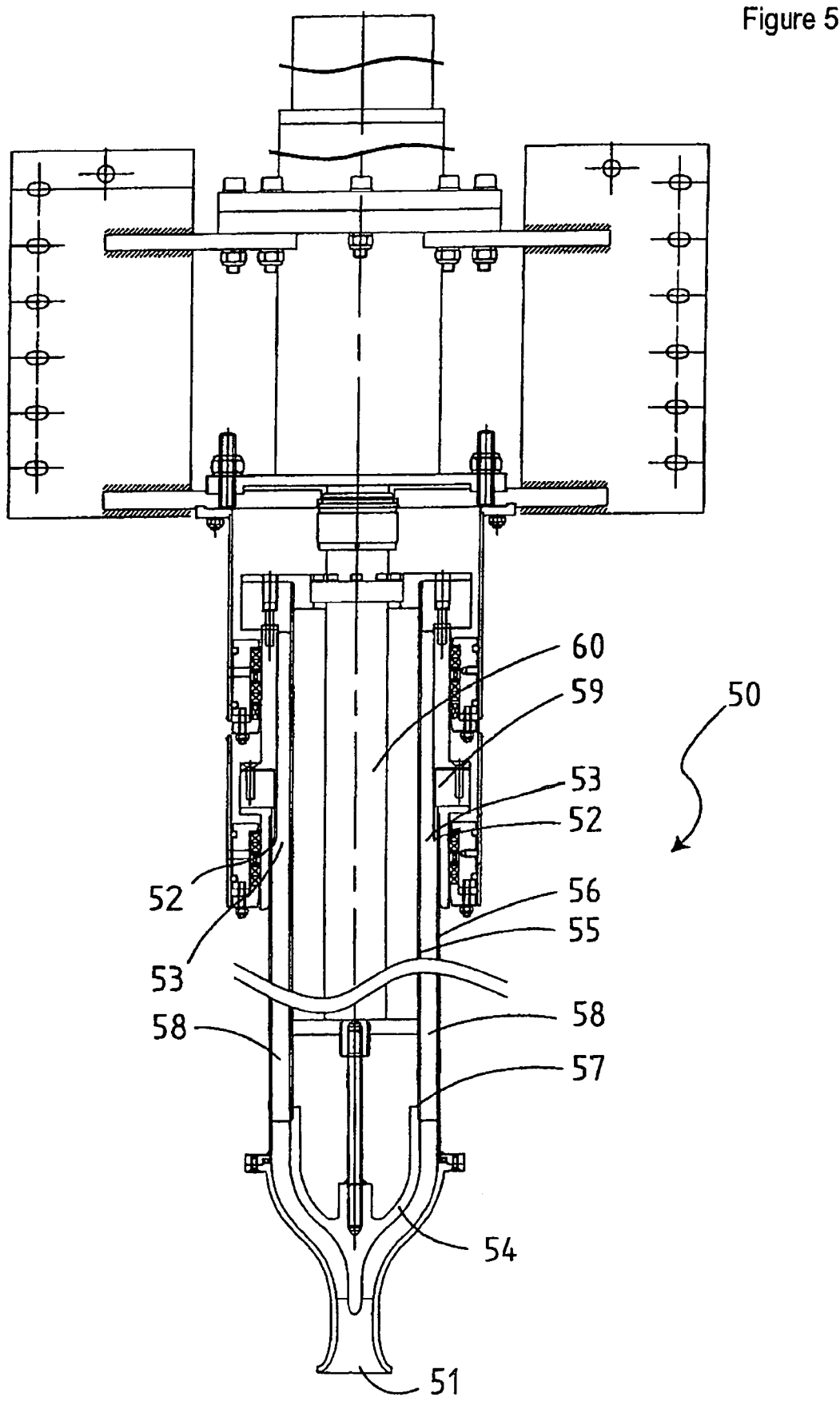
FIG. 5 illustrates a front on cross-sectional view of a solids separator in accordance with the present invention.
Figure 6:
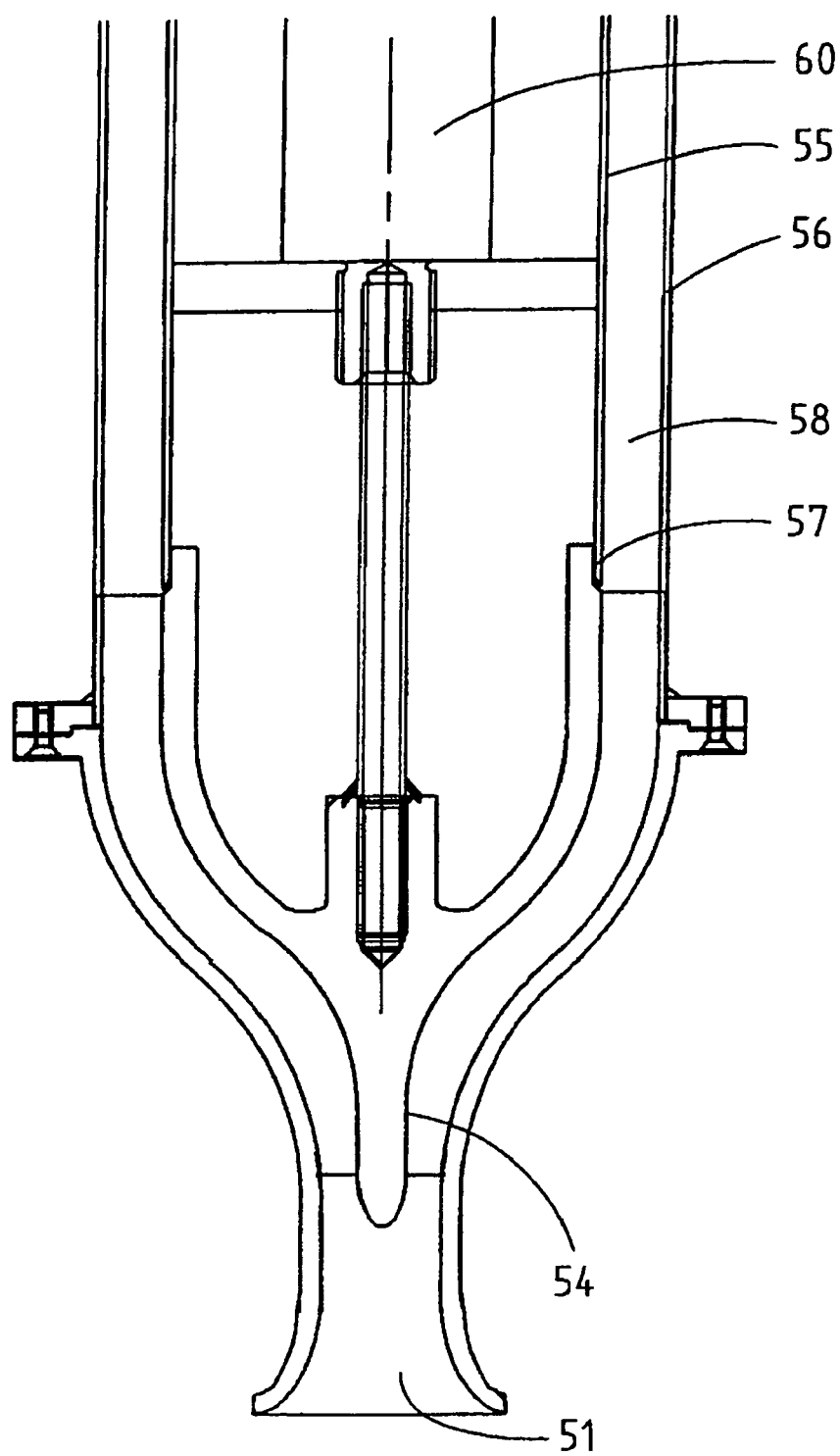
FIG. 6 illustrates the inlet point of a solids separator in accordance with the present invention.

Referring to FIGS. 3 and 4 there is shown a sampling device 21 in accordance with the present invention. The device 21 would typically be placed in a fluid containing entrained solids and/or a fluid mixture of different densities wherein a sample of a particular component with a specific density of the fluid is desired.

The device 21 includes a central shaft 22 which is situated on the central axis of the device 21. The shaft is attached to a rotatable housing 23, via supporting guide vanes 24, and also to a swirl inducing impellor 25. The shaft 22 is rotated by a motor or other suitable means 26 which in turn rotates the rotatable housing and the swirl inducing impellor.

A sample is taken by placing the device 21 into the fluid mixture wherein the fluid is drawn into the device 21 at the inlet 27. The fluid is initially spun in a circular motion by the swirl inducing impellor 25 as it moves through into the rotatable housing 23. As there is virtually no turbulence and the fluid is flowing through in a substantially laminar fashion, the angular velocity of the fluid separates the cross-sectional flow of the fluid mixture into areas of different densities. The denser region being adjacent the rotatable housing 23 and the more buoyant region being adjacent the central shaft 22. A pipette 28 is then used at the outlet of the device to take a sample of the region with the desired fluid density and the rest of the fluid passing through is directed to the outlet 29.

Referring to FIGS. 5 to 9 there is shown a solids separator indicated generally at 50 which includes a fluid inlet 51 and two fluid outlets 52 and 53. The separator further includes a swirl inducing means 54 which imparts a radially outward force to any entrained solids within a fluid flowing through the separator 50 before the fluid enters the passage of flow between the inner rotating housing 55 and the outer rotating housing 56. The swirl inducing means 54 is located on the outer surface of an inverted bell which is attached to the circumferential edge of the inner housing 57. The swirl inducing means is in the form of an impeller along the outside surface of the bell (see FIG. 10) which design not only imparts a radially outward force to the fluid but also lift or a self pumping effect which projects the fluid into the passage of flow 58. A central shaft 60 provides rotation to the swirl inducing means as well as the inner 55 and outer housings 56. The central shaft 60 would typically be rotated by a motor or other suitable means.

A fluid entering the separator 50 is initially spun and lifted into the passage of flow 58 by the swirl inducing means 54. Once in the passage of flow 58 the inner rotating housing 55 and the outer rotating housing 56 maintain the rotational velocity of the fluid such that entrained particles within the fluid move towards the inside surface of the outer rotating housing 56 or the peripheral portion of the cross section of the passage of flow 58. Because the inner and outer housings 55,56 are spinning at a rate similar to the angular velocity of the fluid there is minimal turbulence as the fluid flows through the separator 60 and the fluid flows in a substantially laminar fashion. The fluid flow is separated at the outlets 52 and 53 whereby a tubular separator 59 mounted longitudinally between the inner housing 55 and the outer housing 56 defines the second outlet 52 between the tubular separator 59 and the outer housing 56, and, defines the first outlet 53 between the tubular separator 59 and the inner housing 55. By the time the fluid reaches the first and second outlets 52 and 53, the entrained solids have moved to the periphery portion of the cross section of flow and thereby exit the separator via the second outlet 52. The rest of the fluid or filtrate exits the separator via the first outlet 53. The tubular separator may also be rotated by the central shaft 60.

Figure 7:
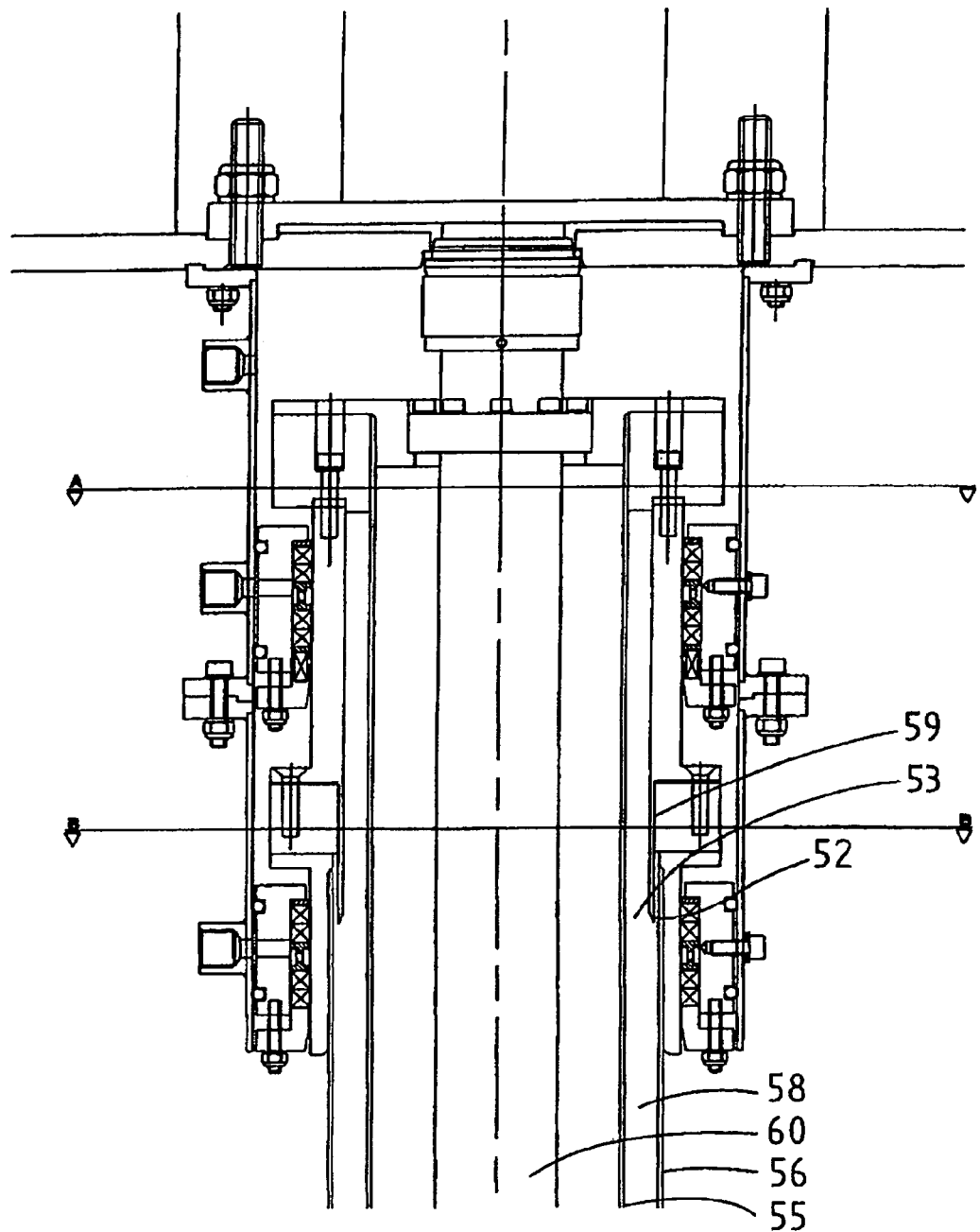
FIG. 7 illustrates the outlet point of a solids separator in accordance with the present invention.
Figure 8:
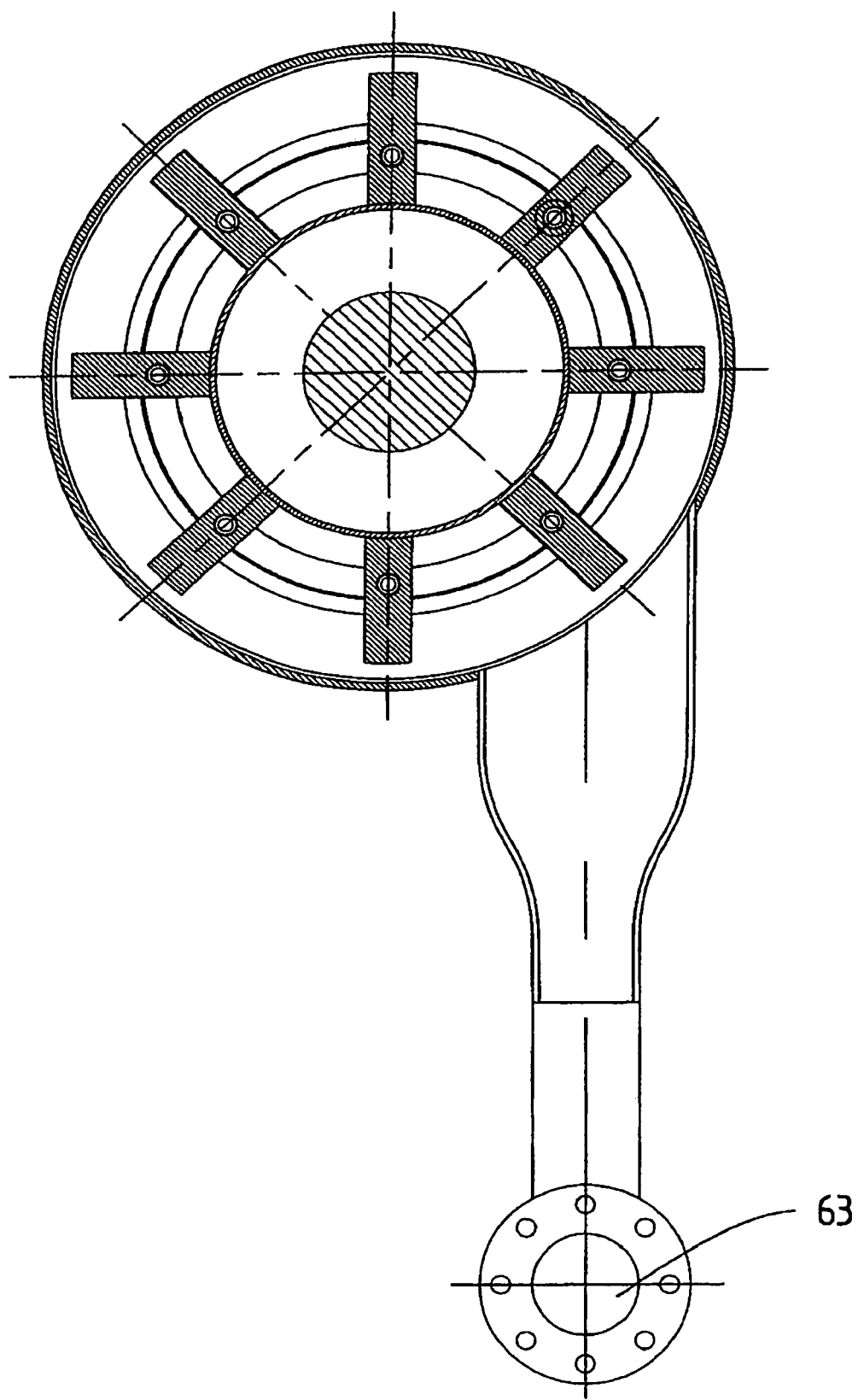
FIG. 8 illustrates a cross-sectional view of the section A—A indicated in FIG. 7.
Figure 9:
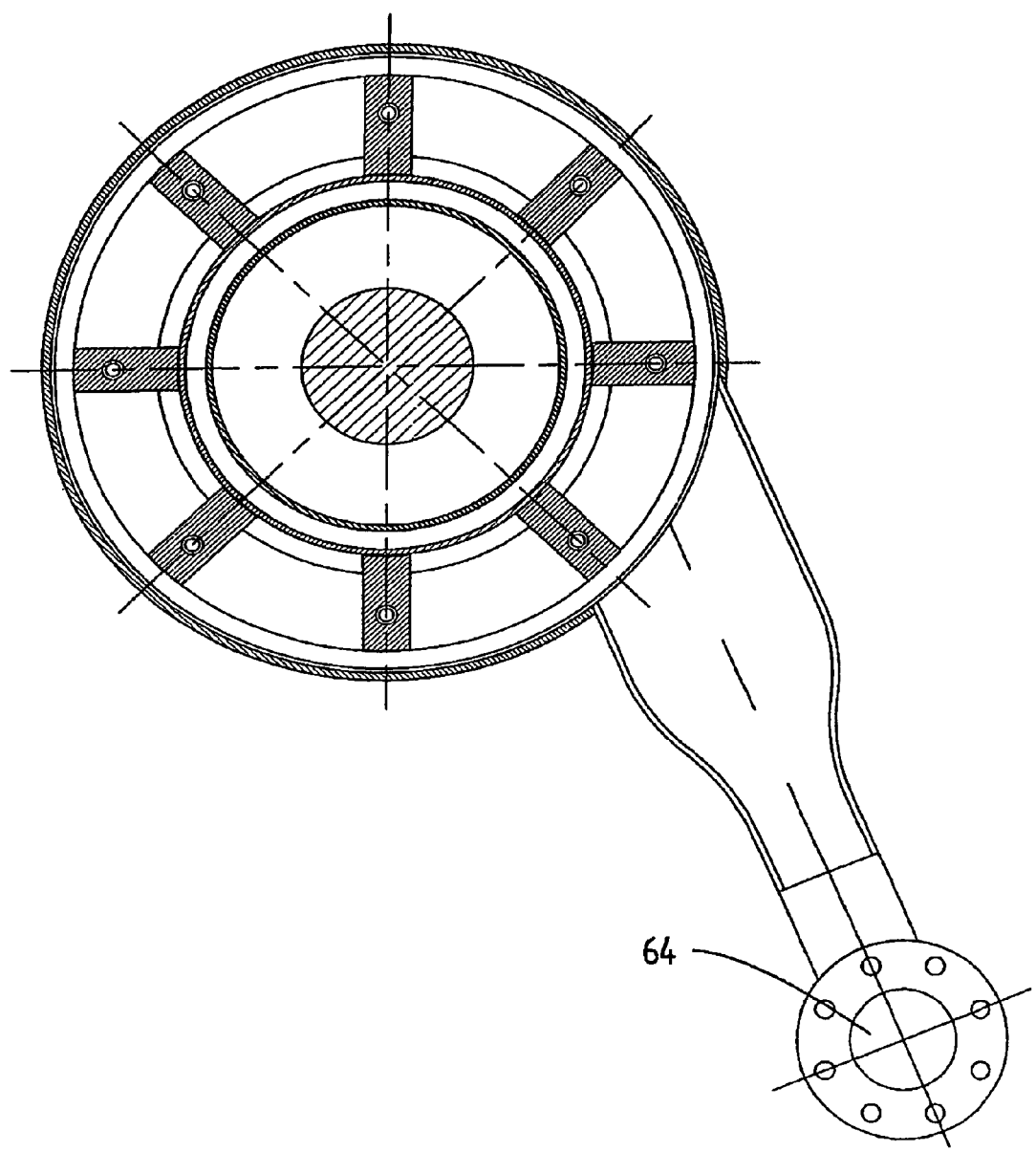
FIG. 9 illustrates a cross-sectional view of the section B—B indicates in FIG. 7.

Referring to FIG. 8, there is shown the cross section A—A depicted in FIG. 7. The cross section shows the exit point 63 from the separator of the first outlet 53. The fluid or filtrate moves up between the tubular separator and the inner housing until it is spun out into the exit 63. Referring to FIG. 9, there is shown the cross section B—B depicted in FIG. 7. The cross section shows the exit point 64 from the separator of the second outlet 52. The concentrated solids move up between the tubular separator 59 and the outer housing until they are spun out into the exit 64.

Figure 10:
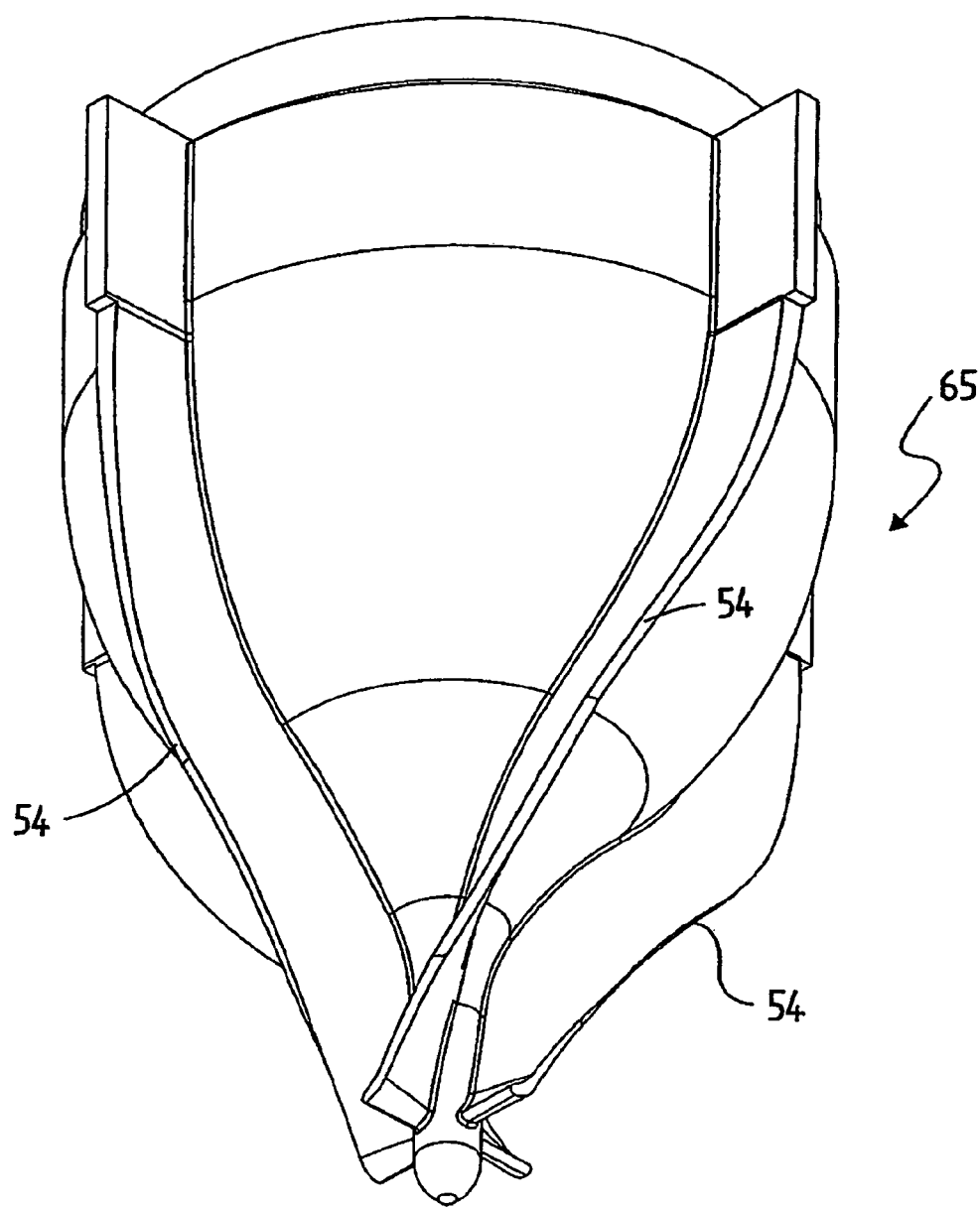
FIG. 10 illustrates the swirl inducing and self pumping means of a solids separator in accordance with the present invention.

Referring to FIG. 10 there is shown a more detailed view of the swirl inducing means 54 in the form of an impeller located on the outer surface of an inverted bell 65. The impeller 54 is shaped such that when rotating it provides a certain degree of lift, or self pumping, as well as rotational spin to the fluid passing through.

Figure 11:
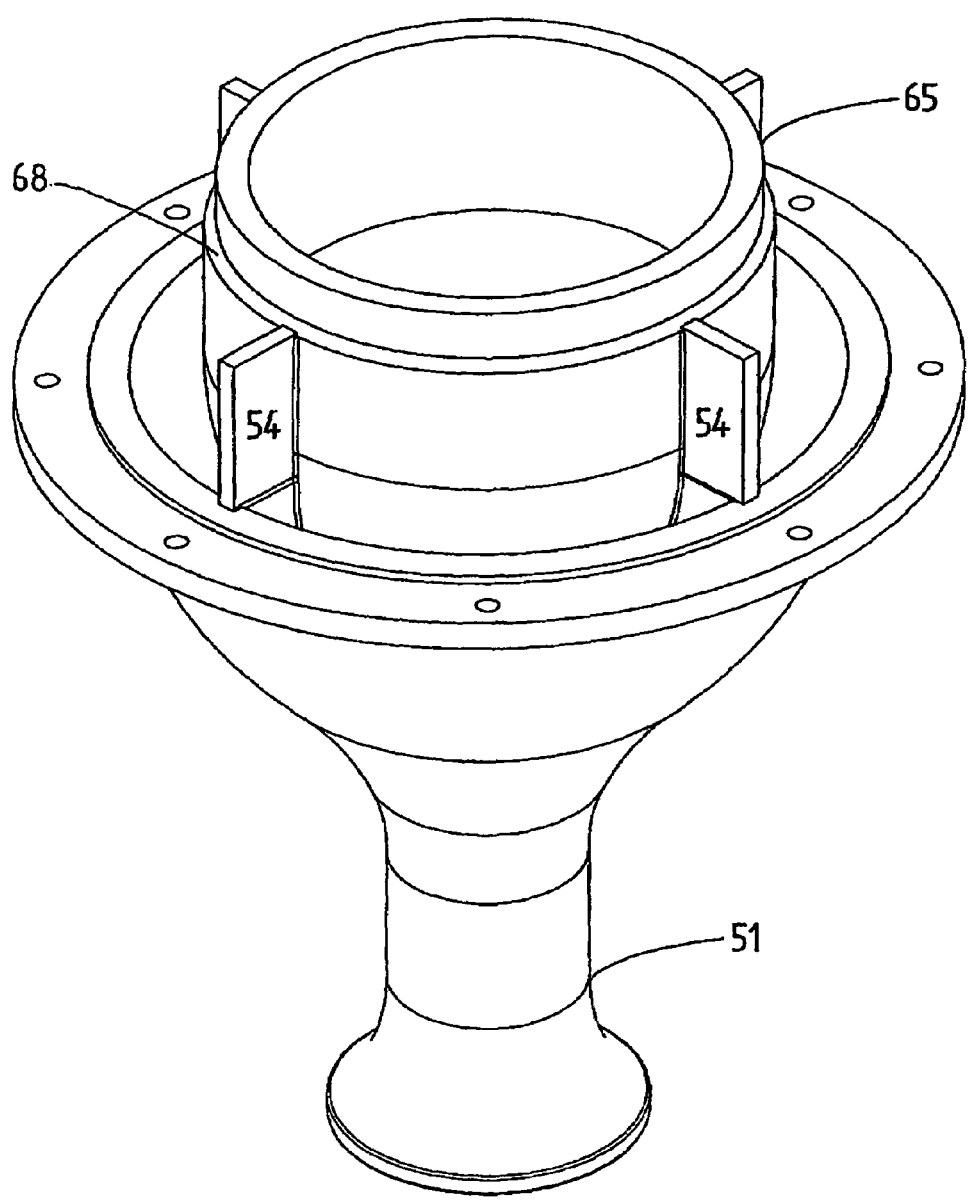
FIG. 11 illustrates the fluid entry point with the swirl inducing means of a solids separator in accordance with the present invention.

FIG. 11 shows the swirl inducing means 54 and inverted bell 65 in combination with inlet of the separator 51. The inner rotatable housing would normally sit flush against the surface indicated at 68.

Although several preferred embodiments have been described in detail, it should be understood that various changes, substitutions, and alterations can be made herein by one ordinarily skilled in the art without departing from the spirit or scope of the present invention.

The invention claimed is:

1. A solids separator including: an elongate tubular housing rotatable around a central axis; a fluid inlet at one end of said housing adapted to receive a flow of a fluid including entrained solids; a first and a second outlet at the opposing end of said housing, wherein, said rotatable housing is effective in imparting a radially outward force to the entrained solids flowing through the separator whereby the solids are concentrated at the peripheral portion of the cross-section of the flow at the first and second outlets and wherein the first outlet is adapted to receive the inner portion of the cross-section of the flow and the second outlet is adapted to receive the peripheral portion of the cross-section of the flow containing the concentrated solids, and wherein the solids separator includes a swirl inducing means located prior to the rotatable housing, wherein said swirl inducing means aids in imparting the radially outward force to the entrained solids.

2. A solids separator according to claim 1 wherein the first and second outlets are defined by a tubular separator longitudinally mounted within the rotatable housing whereby the second outlet is defined between the tubular separator and the rotatable housing and the first outlet is defined through the tubular separator.

3. A solids separator according to claim 1 or claim 2 wherein the tubular separator is rotatable and rotates at the same revolutions per minute as the rotatable housing.

4. A solids separator according to claim 1 or claim 2 wherein the tubular separator rotates faster or slower than the rotatable housing.

5. A solids separator according to claim 1 wherein the swirl inducing means consists of an impeller.

6. A solids separator according to claim 1 wherein the swirl inducing means rotates at the same revolutions per minute as the rotatable housing.

7. A solids separator according to claim 1 wherein the solids separator includes a self pumping means coupled to the rotatable housing, wherein the self pumping means aids in drawing the fluid through the solids separator.

8. A solids separator according to claim 7 wherein the self pumping means consists of an impeller and is located at the outlet of the rotatable housing.

9. A solids separator according to claim 7 or 8 wherein the self pumping means rotates at the same revolutions per minute as the rotatable housing.

10. A solids separator according to claim 1 wherein the angular velocity of the fluid at the peripheral portion of the cross-section of the flow is substantially the same as the angular velocity of the rotatable housing.

11. A solids separator according to claim 1 wherein the rotatable housing rotates at between 500 and 5000 revolutions per minute, preferably the rotatable housing rotates at between 600 and 3000 revolutions per minute and more preferably the rotatable housing rotates at between 800 and 1500 revolutions per minute.

12. A solids separator according to claim 1 wherein the solids separator is orientated in a substantially vertical arrangement and more preferably the fluid inlet is located at the base of said arrangement.

13. A solids separator according to claim 1 wherein the flow rate of the fluid through the separator is such that there is minimal turbulence within the separator and more preferably the fluid flows through in a substantially laminar fashion.

14. A solids separator according to claim 1 wherein the solids separator includes radially extending guide vanes mounted within the rotatable housing, wherein said guide vanes aid in maintaining the angular velocity of the fluid and/or provide structural support to the solids separator.

15. A solids separator according to claim 1 wherein the solids separator includes a central shaft extending through the rotatable housing wherein the shaft does not allow fluid to travel on the central axis through the separator and/or provides structural support to the solids separator.

16. A solids separator according to claim 1 wherein the solids separator includes an external housing which encloses the rotatable housing.

17. A solids separator including: an elongate tubular outer housing rotatable around a central axis; an elongate tubular inner housing also rotatable around the central axis and longitudinally mounted within the outer housing thereby defining a passage of flow between the outer and inner housings; a fluid inlet at one end of the passage of flow and adapted to receive a flow of a fluid including entrained solids; a first and a second outlet at the opposing end of the passage of flow, wherein, the rotatable outer and inner housings are effective in imparting a radially outward force to the entrained solids flowing through the passage of flow whereby the solids are concentrated at the peripheral portion of the cross-section of the flow at the first and second outlets and wherein the first outlet is adapted to receive the inner portion of the cross-section of the flow and the second outlet is adapted to receive the peripheral portion of the cross-section of the flow containing the concentrated solids, and wherein the solids separator includes a swirl inducing means located prior to the outer housing, wherein said swirl inducing means aids in imparting the radially outward force to the entrained solids.

18. A solids separator according to claim 17 wherein the outer housing rotates at the same revolutions per minute as the inner housing.

19. A solids separator according to claim 17 wherein the first and second outlets are defined by a tubular separator longitudinally mounted between the outer housing and the inner housing whereby the second outlet is defined between the tubular separator and the outer housing and the first outlet is defined between the tubular separator and the inner housing.

20. A solids separator according to claim 19 wherein the tubular separator is rotatable and rotates at the same revolutions per minute as either the outer housing or the inner housing.

21. A solids separator according to claim 17 wherein the swirl inducing means is an impeller located on the outer surface of an inverted bell, the outermost circumference of which is coupled to the circumferential edge of the inner housing near the inlet of the passage of flow.

22. A solids separator according to claim 21 wherein the impeller also acts as a self pumping means for pumping the fluid into the passage of flow.

23. A solids separator according to claim 17 wherein the angular velocity of the fluid at the peripheral portion of the cross-section of the flow is substantially the same as the angular velocity of the outer housing.

24. A solids separator according to claim 17 wherein the outer and inner rotatable housing rotate at between 500 and 5000 revolutions per minute, preferably at between 600 and 3000 revolutions per minute and more preferably the at between 800 and 1500 revolutions per minute.

25. A solids separator according to claim 17 wherein the solids separator is orientated in a substantially vertical arrangement and more preferably the fluid inlet is located at the base of said arrangement.

26. A solids separator according to claim 17 wherein the flow rate of the fluid through the separator is such that there is minimal turbulence within the separator and more preferably the fluid flows through in a substantially laminar fashion.

27. A solids separator according to claim 17 wherein the solids separator includes a central shaft extending through the inner rotatable housing wherein the shaft provides structural support to the solids separator.

28. A solids separator according to claim 17 wherein the solids separator includes an external housing which encloses the outer rotating housing.

29. A solids separator according to claim 1 or claim 17 wherein the fluid is a liquid such as liquid waste, and the solids are particles present in a sewage stream.

30. A solids separator according to claim 1 or claim 17 wherein the solids separator is used in place of a clarifier or a sedimentation pond or in place of, or prior to, any unit operations which are limited by the sedimentation rate of solids.

31. A solids separator according to claim 1 or 17 wherein the solids separator may be used to reduce the solids flux load to a clarifier operating in a biological effluent treatment facility.

* * * * *